United States Patent
Hardy et al.

(10) Patent No.: US 8,914,228 B2
(45) Date of Patent: Dec. 16, 2014

(54) METHOD OF SHARING EVENT INFORMATION AND MAP LOCATION INFORMATION

(75) Inventors: Michael Thomas Hardy, Waterloo (CA); Rohit Rocky Jain, Waterloo (CA); Christopher James Runstedler, Cambridge (CA)

(73) Assignee: BlackBerry Limited, Waterloo, Ontario (CA)

( * ) Notice: Subject to any disclaimer, the term of this patent is extended or adjusted under 35 U.S.C. 154(b) by 1256 days.

(21) Appl. No.: 12/238,722

(22) Filed: Sep. 26, 2008

(65) Prior Publication Data

US 2010/0082239 A1    Apr. 1, 2010

(51) Int. Cl.
*G01C 21/00* (2006.01)
*G08G 1/123* (2006.01)
*G01C 21/26* (2006.01)
*G06Q 10/10* (2012.01)
*G09B 29/00* (2006.01)
*H04M 1/725* (2006.01)

(52) U.S. Cl.
CPC .............. *G01C 21/26* (2013.01); *G06Q 10/109* (2013.01); *G09B 29/007* (2013.01); *H04M 1/72566* (2013.01); *H04M 1/72572* (2013.01)
USPC ...................... 701/408; 340/995.14

(58) Field of Classification Search
USPC ........... 701/200–226, 400–541; 340/988–996
See application file for complete search history.

(56) References Cited

U.S. PATENT DOCUMENTS

| | | | |
|---|---|---|---|
| 6,944,539 B2 * | 9/2005 | Yamada et al. | 701/428 |
| 7,289,812 B1 * | 10/2007 | Roberts et al. | 455/456.1 |
| 2003/0200192 A1 * | 10/2003 | Bell et al. | 707/1 |
| 2007/0233635 A1 | 10/2007 | Burfeind et al. | |
| 2008/0109718 A1 * | 5/2008 | Narayanaswami | 715/262 |
| 2009/0006994 A1 * | 1/2009 | Forstall et al. | 715/764 |
| 2009/0293011 A1 * | 11/2009 | Nassar | 715/781 |

OTHER PUBLICATIONS

European Search Report for EP application 08165298.4 mailed Jan. 29, 2009.
Examiner Report from corresponding Canadian application No. 2,678,3156 dated May 7, 2012.
Examiner report from corresponding Canadian Application No. 2,678,315 dated Oct. 24, 2013.

* cited by examiner

*Primary Examiner* — Muhammad Shafi
(74) *Attorney, Agent, or Firm* — Gowling Lafleur Henderson LLP

(57) ABSTRACT

In a method of sharing location information between a map application and a calendar application, the map application pulls calendar event locations from a calendar event store and presents these calendar event locations as suggested locations for the map application. Likewise, the calendar application pulls map locations from a map location data store and presents these map locations as suggested locations for calendar events. By sharing location information between the map application and the calendar applications, these applications become significantly more useful.

15 Claims, 10 Drawing Sheets

600

NEW APPOINTMENT

| SUBJECT | DENTIST APPOINTMENT WITH DR. B. |
| --- | --- |
| LOCATION | 160 ELGIN STREET, OTTAWA |
| START | 3:00 PM, JULY 10, 2008 |
| END | 4:00 PM, JULY 10, 2008 |
| REMINDER | 15 Min. |
| RECURRENCE | None |

METHOD OF SHARING EVENT INFORMATION AND MAP LOCATION INFORMATION

CROSS-REFERENCE TO RELATED APPLICATIONS

This is the first application filed for the present technology.

TECHNICAL FIELD

The present technology relates to computing devices having both map and calendar applications.

BACKGROUND

Desktops, laptops, mobile devices and other computing devices are able to run various applications, including calendar applications and mapping applications.

Calendar applications enable users to schedule appointments, meetings or other events. Users can enter event descriptions, event location information, start times, end times, enable reminders, share calendars remotely with other users, send meeting requests, set up recurring events, and perform a variety of other related functions. Typically, the user manually enters information describing an appointment or event (or cuts and pastes this information from another application that may contain this information). A very limited amount of linking to other applications is provided. For example, when setting up a meeting, some applications enable direct access to an address book to pull up names of contacts to be invited (along with their e-mail addresses).

Map applications enable networked users to download map data from a map data server for rendering digital maps onscreen. These maps can be obtained for specific addresses, for the current location (where the device is position-aware), or can simply enable the user to zoom and pan from a starting map of the world or their continent. Typically, a location or address to be mapped is specified manually or by cutting and pasting address information from another source. For example, some applications enable direct mapping of contact address information.

Although calendaring and mapping applications are popular, it remains desirable to provide greater synergy or interactivity between these applications.

BRIEF DESCRIPTION OF THE DRAWINGS

Further features and advantages of the present technology will become apparent from the following detailed description, taken in combination with the appended drawings, in which:

FIG. 6 is a schematic depiction of the interface shown in FIG. 5 after selection of one of the suggested locations in which case the location field is automatically populated with the suggested location that has been chosen;

It will be noted that throughout the appended drawings, like features are identified by like reference numerals.

DETAILED DESCRIPTION

Figure 1:
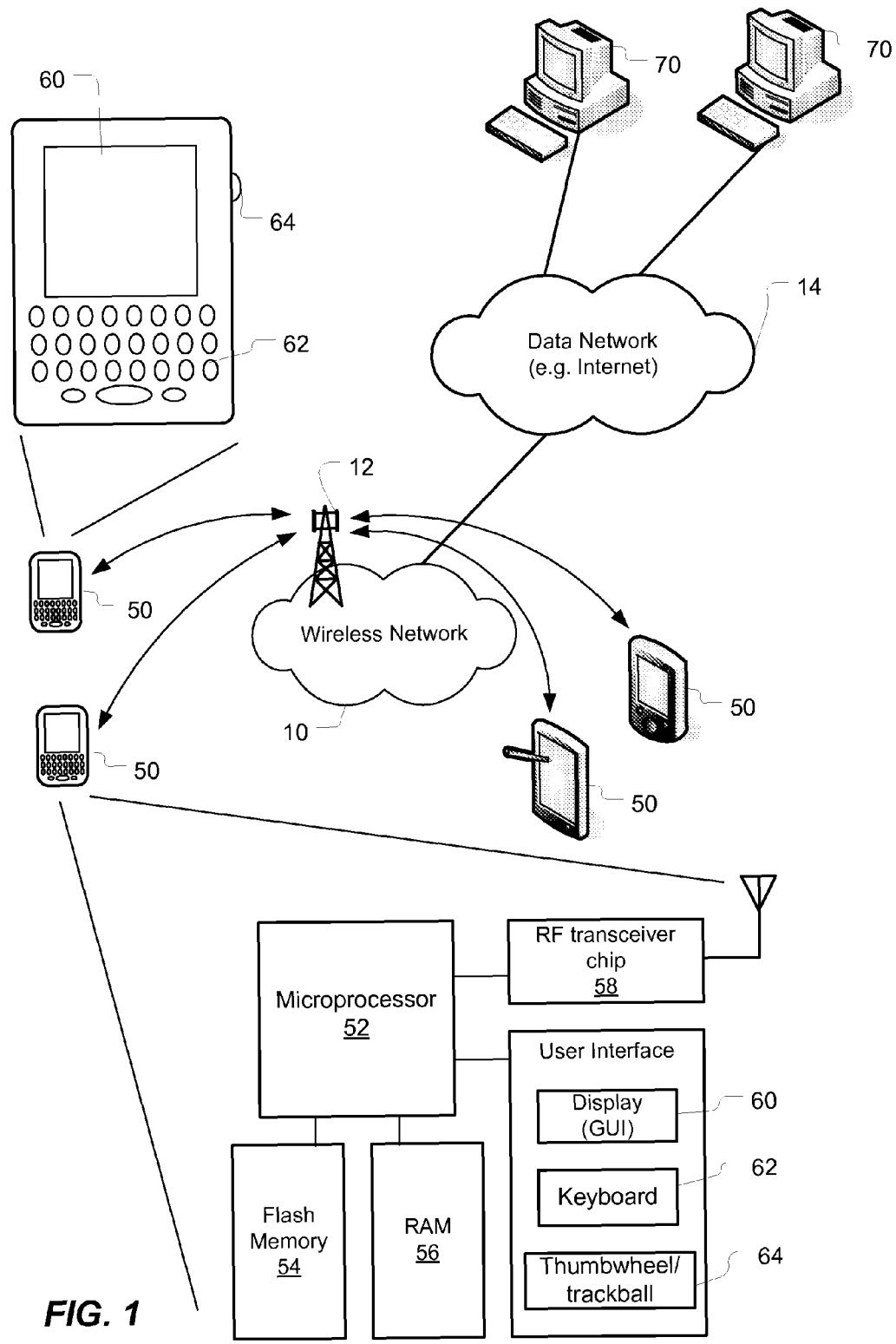
FIG. 1 is a schematic depiction of a number of different networked computing devices, including desktop computers and handheld electronic devices, upon which the present technology can be implemented.

In general, the present technology enables a calendar application and a map application to share location-related information with each other. Location information that is stored for calendar events can be used by the map application to provide suggested locations for input to the map application. Conversely, location information that is stored for downloaded maps (e.g. addresses that are entered into the map application) can be used by the calendar application as suggested locations for events (or meetings or appointments) to be entered into the calendar.

Thus, a main aspect of the present technology is a method of sharing location information between a map application and a calendar application. When the map application is executing on a computing device, the method involves obtaining calendar event locations stored by a calendar application in a memory of the device to enable the map application to suggest the calendar event locations as possible input for the map application. When the calendar application is executing on the computing device, the method involves obtaining map locations stored by a map application in a memory of the device to enable the calendar application to suggest the map locations as possible input for the calendar application.

Another main aspect of the present technology is a computer program product comprising code which when loaded into memory and executed on a processor of a computing device is adapted to perform the steps of the preceding method. In particular, when a map application is executing on the device, the code causes calendar event location information to be pulled from a calendar event data store associated with a calendar application in order to populate an interface of the map application with location suggestions drawn from the calendar event location information. When the calendar application is executing on the device, the code causes map location information to be pulled from a map location data store associated with the map application in order to populate an interface of the calendar application with location suggestions drawn from the map location information.

Yet another main aspect of the present technology is a computing device, such as, for example, a handheld electronic device, that has a processor operatively coupled to a memory for storing and executing a mapping application and a calendar application. The memory stores map location information in a map location data store associated with the map application and stores calendar event location information in a calendar event data store associated with the calendar application. The processor is operatively coupled to the memory for executing one or both of the map application and the calendar application. The map application is configured to pull calendar event location information from the calendar event data store and to present, on an interface of the map application, location suggestions based on the calendar event location information. The calendar application is configured to pull map location information from the map location data store and to present, on an interface of the calendar application, location suggestions based on the map location information.

The details and particulars of these aspects of the technology will now be described below, by way of example, with reference to the attached drawings.

FIG. 1 depicts schematically a plurality of different computing devices (e.g. wireless devices 50 and desktop computers 70) that are, by way of example only, networked in order to access remotely stored map data for map applications executing on these devices. The desktop computers 70 are shown networked to a data network 14 (e.g. the Internet). The wireless devices 50 are shown networked via wireless network 10 (and base station tower 12) to the same data network 14.

For the purposes of this specification, the expression "computing device" is meant to encompass a broad range of electronic devices that have processors and memory, and which are capable of executing both a calendar application and a map application. Accordingly, "computing device" is meant to encompass desktop computers, laptops, tablet PCs, portable, handheld or mobile electronic devices such as smart phones, cell phones, satellite phones, and wireless-enabled PDA's, etc., or any hybrid or multifunction device. Although it is possible for all the map data for the mapping application to be pre-loaded on the device (e.g. a GPS navigation unit), the computing device in most instances will be networked to a data network (e.g. the Internet) to download the map data from a map data server using TCP/IP or other communication protocols.

Referring again to FIG. 1, each computing device includes a microprocessor or central processing unit (or simply a "processor") and a memory for storing and executing a calendar application and a mapping application. For example, each wireless device 50 shown in FIG. 1 has a microprocessor 52, flash memory 54, and RAM 56. Each wireless device 50 also includes include an RF transceiver chip 58 for wireless communications that enable wireless downloading of map data for the map application. Furthermore, each of the wireless devices 50 has a user interface that includes a display (graphical user interface) 60, e.g. a LCD screen, a keyboard/keypad 62 and an optional thumbwheel/trackball. For certain types of handheld devices on which this technology may also be implemented, it is important to note that some of these components would not be required. For example, if the wireless device is simply a portable device like a GPS navigation unit preloaded with map data, then the RF transceiver chip 58 would be unnecessary (i.e. only a GPS receiver would be required).

Figure 2:
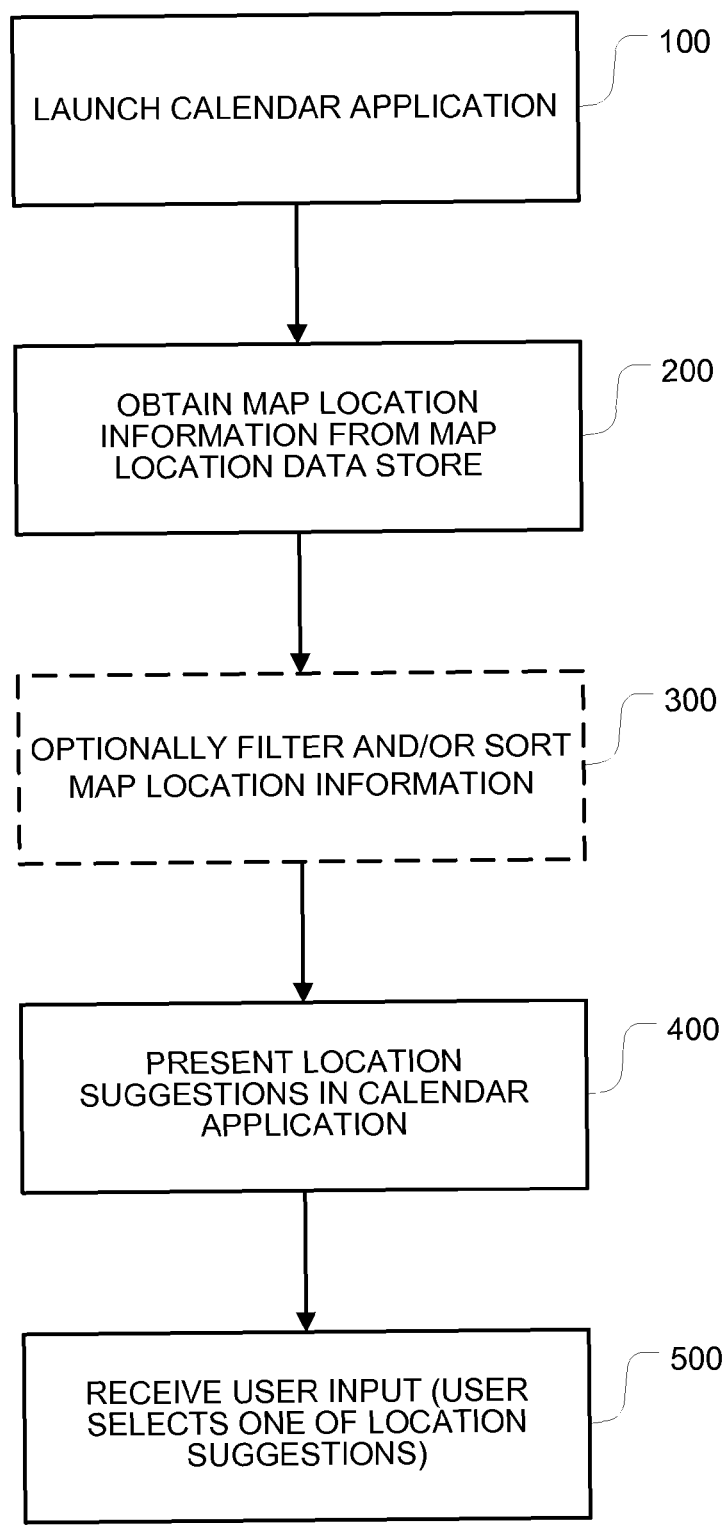
FIG. 2 is a flowchart outlining some of the main steps of a method of pulling location information from a map application into a calendar application in accordance with one or more implementations of the present technology.

FIG. 2 is a flowchart outlining some of the main steps of a method of sharing location information between a calendar application and a map application in accordance with one or more implementations of the present technology. As depicted in FIG. 2, this flowchart depicts the specific case where a calendar application obtains suggested locations from map location data that has already been obtained by the map application. As shown in FIG. 2, after an initial step 100 of launching the calendar application, the calendar application then (at step 200) obtains map location information from a map location data store. In optional step 300, the map location information pulled from the map location data store may be filtered and/or sorted according to various criteria specified by the calendar application. These criteria can be configured by the user, by the system administrator, or by any other person, or alternatively can be based on default settings set by the manufacturer or developer. At optional step 300, the calendar application can be configured to sort and present the map locations in order of proximity from a closest map location relative to a current location of the device to a furthest map location relative to the current location of the device. At step 400, the calendar application presents the location suggestions onscreen. The location suggestions can be, for example, a drop-down menu or list of addresses that were recently input into the map application, i.e. addresses for which maps were obtained. At step 500, the calendar application receives user input. In other words, at step 500, the user selects one of the suggested locations from the list. This may then cause the location field of the calendar event to be automatically filled with the address information from the selected suggestion. In one implementation, the calendar application can obtain further information automatically such as city, state or province, country, etc. by looking up the address in a database. If the user does not wish to select one of the suggested locations, the user can manually enter (type or cut and paste) a new address into the location field.

Figure 3:
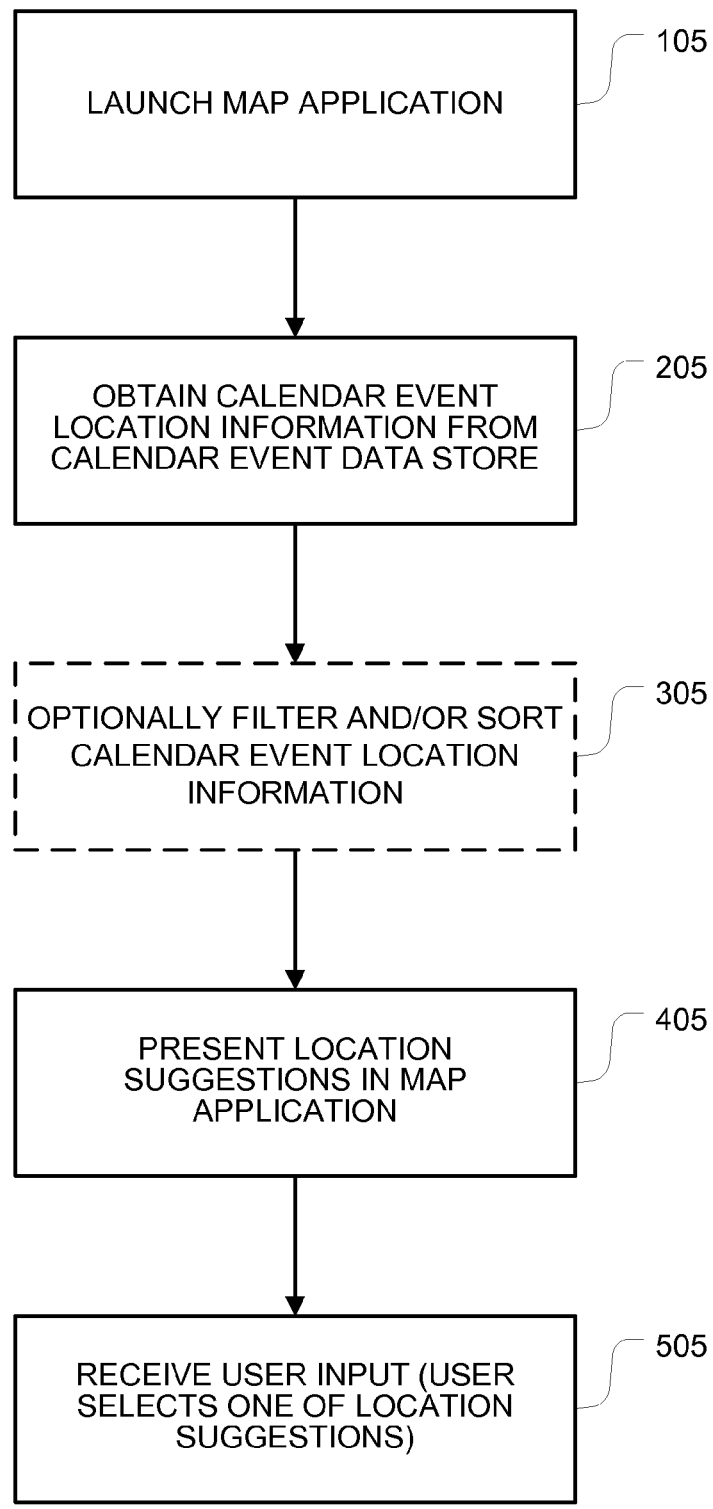
FIG. 3 is a flowchart outlining some of the main steps of a method of pulling location information from a calendar application into a map application in accordance with one or more implementations of the present technology.

FIG. 3 schematically depicts another flowchart showing main steps of importing calendar event location information into a map application. In other words, FIG. 3 shows how calendar event location information is pulled into the map application whereas FIG. 2 showed how the converse is performed, i.e. how map location information is pulled into the calendar application. Thus, the map application and calendar application can share location information either unidirectionally (asymmetrically) or bidirectionally (symmetrically). As shown in FIG. 3, after an initial step 105 of launching the map application, the map application obtains calendar event location information from a calendar event data store at step 205. Optionally, this calendar event location information can be filtered and/or sorted (at step 305) to create a list of appropriate location suggestions for presentation to the user. At optional step 305, the map application can be configured to only obtain calendar event locations for recent events that fall within a predetermined timeframe. At optional step 305, the map application can be configured to sort and present the calendar event locations in temporal order from a most recent event to a least recent event. At step 405, the location suggestions are presented in the map application, such as, for example, in the form of a drop-down menu or list of addresses, cities, landmarks, commercial establishments, etc. This menu can drop down from the location field or a list in a dialog box can pop up. At step 505, the map application receives user input in the form of a selection of one of these suggested locations. This may cause the location (or address)

field to be filled automatically with the information corresponding to the selection. Alternatively, the user can manually enter a new address or location in the field, thus ignoring the suggestions made by the map application.

FIGS. 4 to 10 illustrate, by way of example, further features and attributes of this novel technology.

Figure 4:
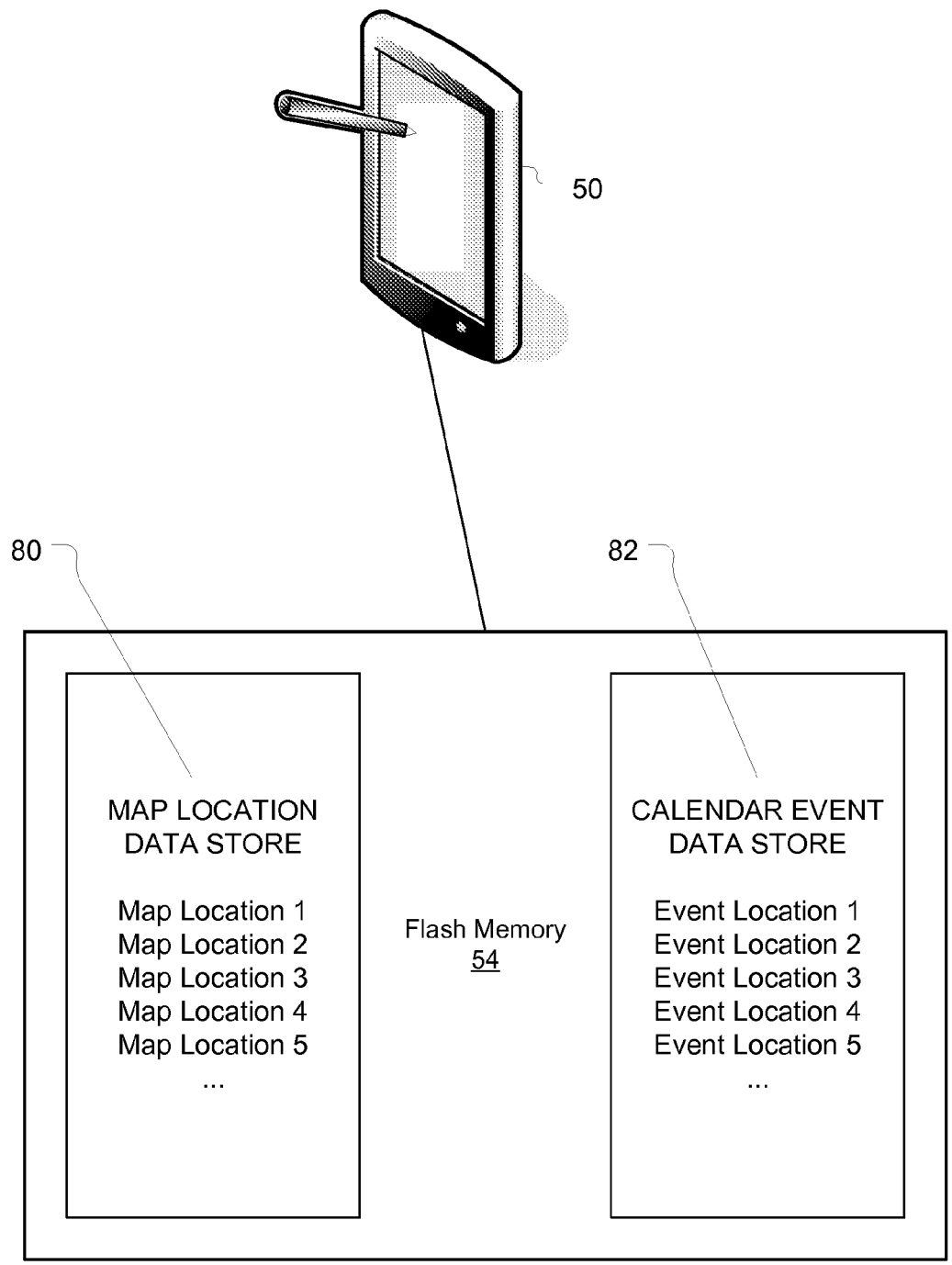
FIG. 4 is a schematic depiction of a map location data store (containing map location information for a plurality of map locations) and a calendar event data store (containing calendar event location information for a plurality of calendar event locations) that are stored in flash memory of a handheld electronic device as one example of a computing device in which the present technology can be implemented.

The calendar event location information and the map location information that are available for sharing between the calendar and map applications can both be stored directly in the memory of the handheld electronic device, e.g. in flash memory 54 as shown by way of example in FIG. 4. Alternatively, the calendar event location information and the map location information can be stored remotely in one or more remotely accessible storage devices, e.g. one or more servers or databases accessible via a wireless network and data network by a handheld electronic device equipped with a wireless transceiver. In a further variant, one of the calendar event location information and the map location information can be stored locally on the device while the other is stored remotely. However, to minimize the burden on the bandwidth of the wireless link, the map location information and the calendar event location information can be stored directly in the flash memory 54 of the device 50.

As shown by way of example in FIG. 4, the map location information and the calendar event location information can be stored in a map location data store 80 and a calendar event location data store 82, respectively. FIG. 4 schematically depicts the map location data store 80 and the calendar event data store 82 that are stored in the flash memory 54 of the handheld electronic device 50 (e.g. a wireless communications device). The map location data store 80 stores a list of map locations (e.g. Map Location 1, Map Location 2, etc.) for which maps were requested. These map locations could be, for example, street addresses, commercial establishments, landmarks, towns, cities, coordinates of latitude and longitude, etc.

These map locations could also be places that the user and handheld device have visited. This would require the handheld device to be location-aware, e.g. have a GPS receiver. For example, the location-aware device could register locations as waystations that were visited provided the user (and the user's device) remained at that location for more than a predetermined period of time. For example, the device could be configured to record a current location if the device remains within a predetermined distance of that current location for a predetermined amount of time. For example, if the user stops for lunch at a restaurant, the device could record that location as being a waystation where the user had spent a significant amount of time. The device could then use reverse geocoding (reverse lookup) to determine what the street address is and/or what the commercial establishment's name is based on the GPS coordinates. Thus, suggested locations can be accumulated by the device not only by user input (address-based map requests) but also by where the user has physically traveled. In other words, the device can intelligently and automatically store location entries based on GPS readings.

Regardless whether the map location information is derived from places visited or from map requests made by the user, the map location information can be stored in the map location data store and thus readily shared with the calendar application to auto-populate suggested locations for new events or appointments that are created by the user.

Similarly, the calendar event data store 82 stores a list of event locations (e.g. Event Location 1, Event Location 2, etc.) for which the user has entered appointments. The event locations are mainly drawn from the location field of the appointment or event. For example, the user of the device may enter a location ("123 Main Street") for a dentist appointment. This address ("123 Main Street") would then be stored as a calendar event location in the calendar event data store 82. As a further example, the user may enter an event for a barbeque at a friend's house ("10 Main Street"). The device would then also store this address ("10 Main Street") in the calendar event data store. Subsequent entries would be stored in a like manner until the maximum allowable capacity (limit) of the data store is reached. This maximum allowable capacity, or limit, may be configured by the user or system administrator or may be preset by the device manufacturer or software developer. Once the limit is reached, new location entries can be stored by flushing out the old entries in the data store. Alternatively, the device can be configured to periodically purge entries that have been stored for more than a predetermined period of time, or ones that the user has never selected when these have been suggested as possible locations. In a variant, the device could prompt the user to purge the location entries after a period of time. While the location information for these location entries can be drawn from information that the user enters into an event location field, in a variant, the event location can be determined from the subject line of the appointment (or from another part of the event description) by parsing the language to look for clues about the location. For example, if the subject of the event/appointment is Dinner at John Smith's House, the device could search its contacts list for a John Smith. If such a contact exists in the address book, the device could then extract the address information corresponding to the John Smith entry in the address book. This could then be used as a location suggestion in the map application. In other words, the calendar event information stored in the calendar event data store can be used by the map application to auto-populate a list of suggested or possible map locations to the user when the user initiates a location search or map request.

Instead of using a flash memory 54 to locally store the calendar event location information and the map location information, as illustrated in the example presented in FIG. 4, the device can use any other type of non-volatile memory (NVM) or non-volatile storage, i.e. memory that retains the stored information even when the device is powered off. Examples of non-volatile memory that can be incorporated into the device 50 include, for example, various forms of read-only memory (ROM) such as a magnetic computer storage device (e.g. a hard disk), an optical disc drive, a magneto-resistive Random Access Memory (MRAM), a solid-state drive (SSD), or any other long-term persistent storage device that can be adapted for use in a handheld electronic device.

Figure 5:
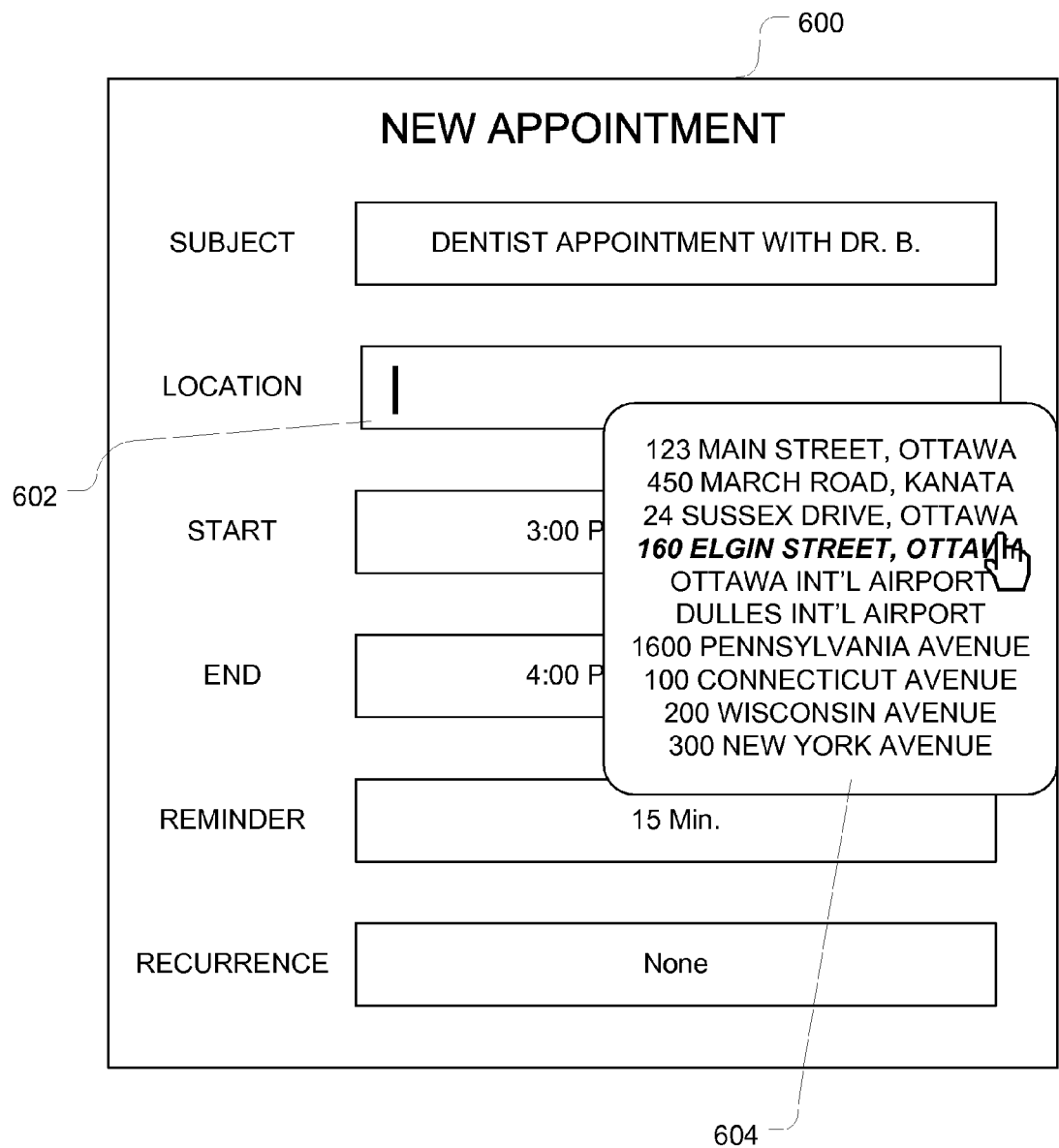
FIG. 5 is a schematic depiction of an appointment entry interface in a calendar application that provides suggested locations drawn from map location information (e.g. addresses used for recent map searches)

FIG. 5 schematically depicts a new appointment (or new event) interface 600 which is used to enter information describing a new appointment or event. Thus, the user fills out fields such as "Subject", "Start", and "End" and then selects whether a reminder is to be provided a certain time before the beginning of the event and whether the event is recurring or not. In addition, as shown in FIG. 5, the event/appointment creation form (interface 600) enables the user to specify a location. A location field 602 is typically provided for this purpose. In accordance with one aspect of the present technology, a list of suggested locations 604 appears onscreen. The suggested locations 604 can appear in a pop-up box or dialog, as shown schematically in FIG. 5. Alternatively, the list can be in the form of a drop-down menu (or in any other form for that matter). The suggested locations (or "location suggestions") 604 for the event/appointment are drawn from the map location data store (and thus represent map searches that the user has performed, or alternatively locations that have been visited with a GPS-enabled device). By selecting one of these suggested locations, the location field 602 is automatically filled out as shown in FIG. 6. The user could also choose not to select one of the suggestions and simply type in an address or other location information to describe where the appointment or event is scheduled to take place. In one implementation, the drop down menu (or list of suggestions in the dialog) can be made to appear by clicking on the location field 602.

Figure 7:
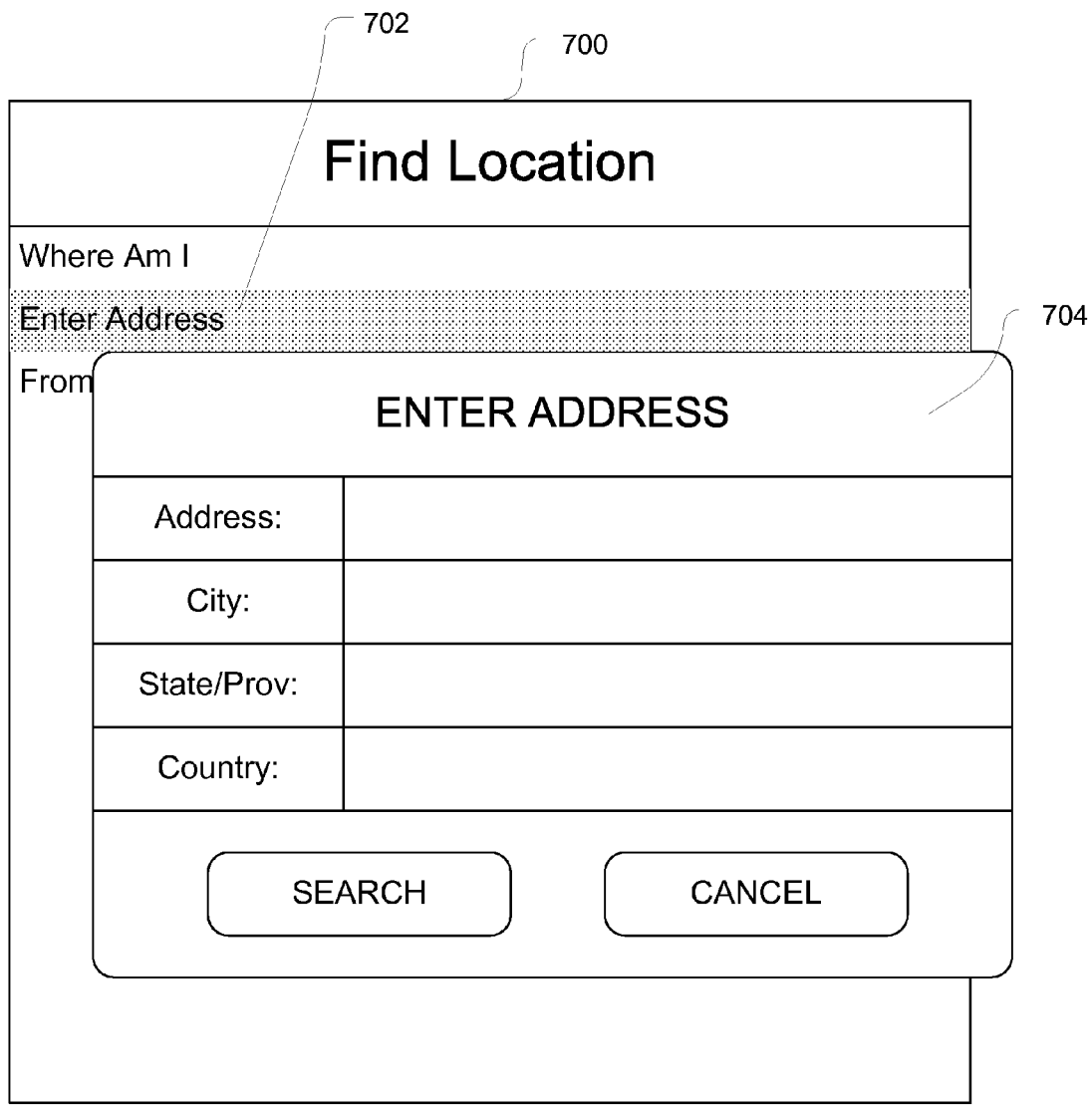
FIG. 7 is a schematic depiction of an example location-mapping interface of a map application that enables a user to request a map corresponding, for example, to an address or to a current location of the device.

Referring now to the example presented in FIG. 7, a map application can have a "Find Location" interface 700 or alternatively a screen or box that enables the user to search for a map by address or some other criterion. In this particular example shown in FIG. 7, the Find Location screen 700 has an option to search for a map by entering the address (e.g. the Enter Address link or button 702). This Enter Address link 702 brings up an address box 704 that prompts the user to enter the address, city, state or province, and country. The user can thus search by entering one or more of these parameters. This address box is merely shown by way of example. Other features could be present such as a field to search by landmark, keyword, commercial establishment, postal code, etc.

Figure 8:
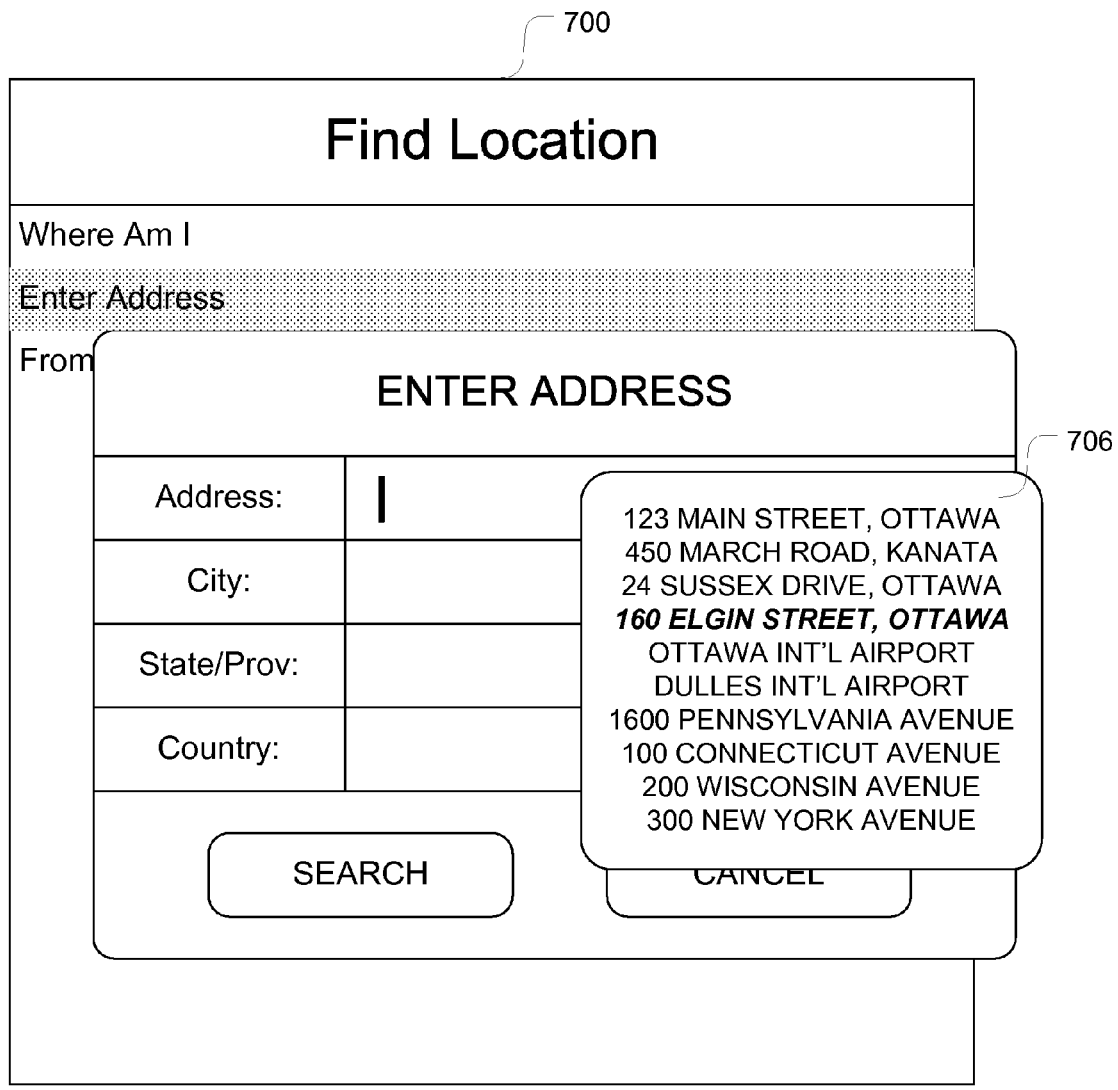
FIG. 8 is a schematic depiction of the example location-mapping interface shown in FIG. 7, further depicting a dialog containing suggested locations that are drawn from calendar event locations.

FIG. 8 shows a dialog with a list of suggested locations 706. For the map application, these suggestions are derived from the calendar event data store, i.e. these location suggestions are based on the location information that has been stored for various events. Instead of this dialog or superimposed box, the suggested locations can be presented in a drop-down menu or in any other form. To bring up the suggested locations, the user can, for example, click on the address field or scroll the trackball or thumbwheel to place the cursor in this address field as shown in FIG. 8. Suggestions can be invited by the user in any number of different ways, e.g. by clicking a dedicated suggestion button, pressing a suggestion hotkey, or by issuing verbal (audible) instructions to provide a suggestion to a device that is equipped with speech recognition technology.

Figure 9:
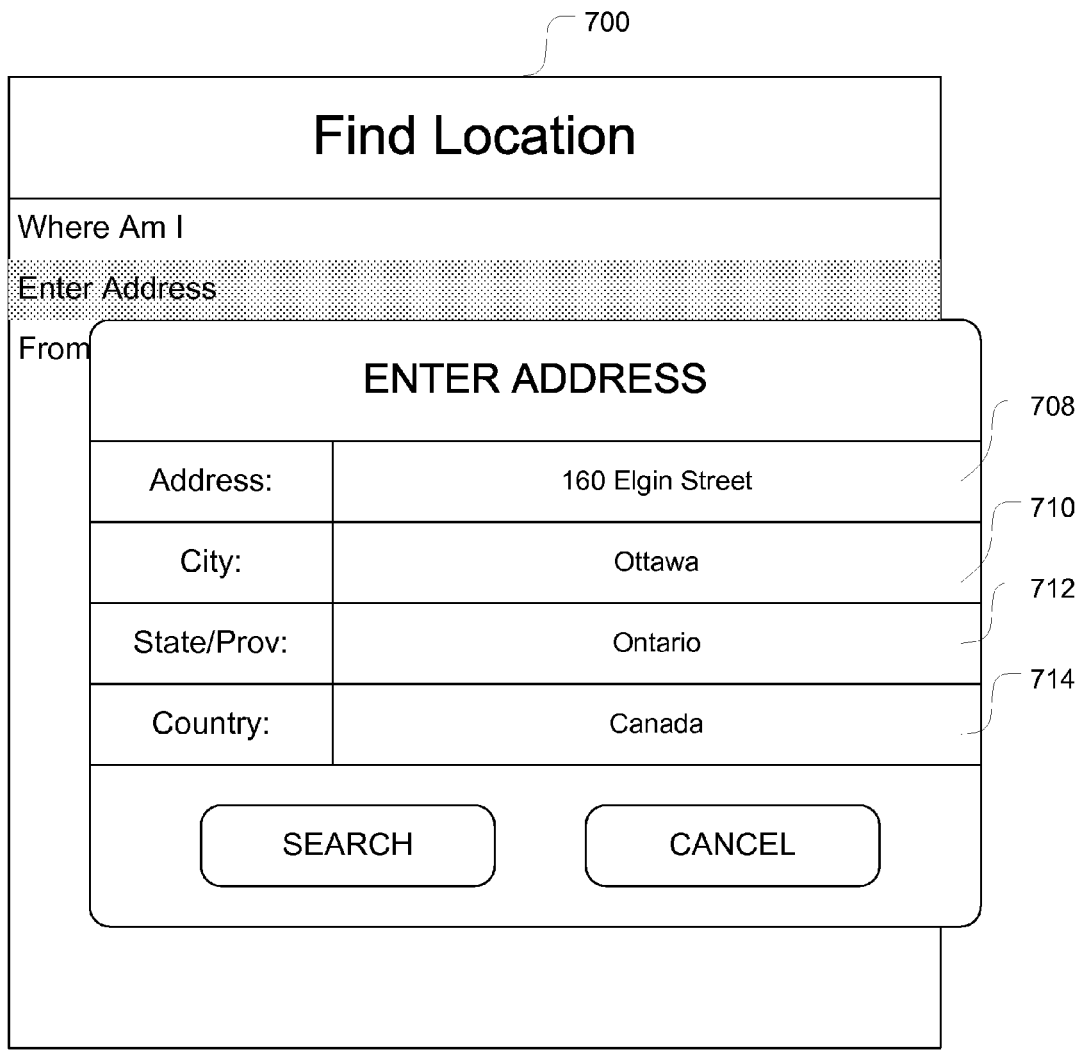
FIG. 9 is a schematic depiction of the example location-mapping interface introduced in FIG. 7 showing a street address in the location field (after this address has been selected from the list of suggested locations)

As shown by way of example in FIG. 9, once the user makes a selection, the map application can be configured to automatically populate all of the address information in the various fields: Address 708, City 710, State/Province 712, Country 714. In certain cases, only a subset of this information will be available because the location of the corresponding calendar event was only described partially. For example, the appointment might only be described at being at 160 Elgin Street. The device could then determine that this address corresponds to Ottawa, Ontario, Canada. Optionally, where the address is ambiguous, i.e. where the address could be in two or more different cities, the device could offer each choice to the user and prompt the user to specify which one is the appropriate one. Alternatively, the device could intelligently surmise that the address belongs to a given city based on proximity to a current location of the device (e.g. as determined by GPS readings) or by proximity to other stored locations. For example, if all locations are in Canada, then the device can deduce that a possible address in Australia is not likely to the one intended by the user.

Figure 10:
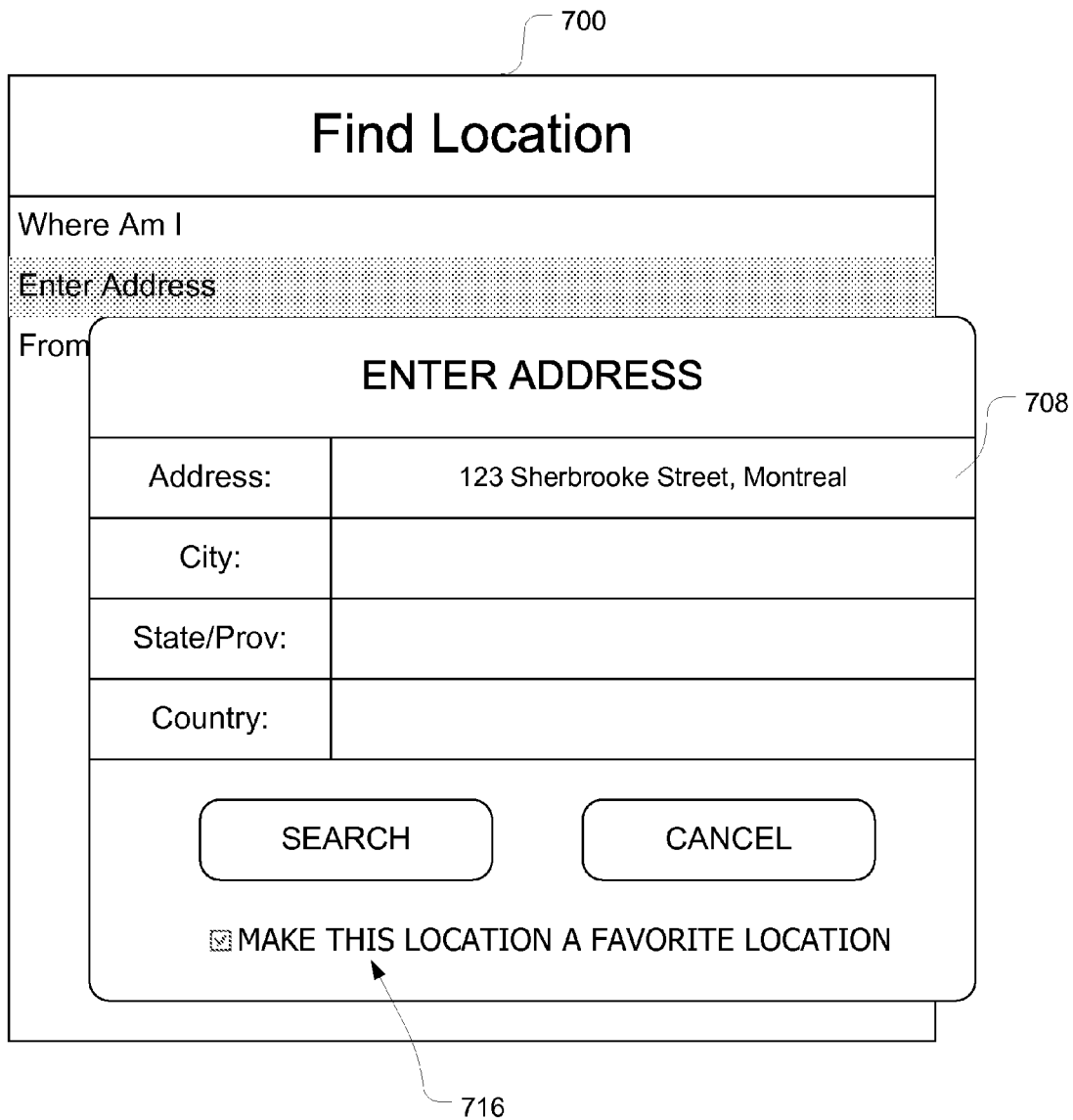
FIG. 10 is a schematic depiction of a variant of the location-mapping interface introduced in FIG. 7 showing, by way of example, a feature that enables the user to mark the location as a favourite location so as to share this location with the calendar application.

FIG. 10 schematically depicts a variant of the technology described with respect to FIGS. 7 to 9. In FIG. 10, the Enter Address screen includes a feature 716 to make a given location that has been entered a favourite location. By selecting this favourite location feature 716, the device knows to share this location with the calendar application. Depending on settings and preferences, it is possible to make this location immune to any filtering that may occur when the calendar application is next used to specify a location of an event. Accordingly, the map application can be configured to provide a "mark-as-favourite" option 716 to identify a specific map location as being a favourite location that is to become one of the suggested locations for the calendar application.

Similarly, the favourite location feature can be used in the calendar application in an analogous manner. For example, the favourite location feature can be clicked or otherwise activated by the user when a new appointment form is filled out. In other words, when the user types (or cuts and pastes) location information into the new appointment screen 600, the user can specify that this new location is to become a suggested location for the map application. Accordingly, the calendar application can be configured to provide a "mark-as-favourite" option 716 to identify a specific calendar event location as being a favourite location that is to become one of the suggested locations for the map application.

This new technology has been described in terms of specific implementations and configurations which are intended to be exemplary only. The scope of the exclusive right sought by the Applicant is therefore intended to be limited solely by the appended claims.

The invention claimed is:

1. A method of sharing location information between a map application and a calendar application, the method comprising:
while the map application is executing on a computing device, obtaining calendar event locations stored by a calendar application in a memory of the device to enable the map application to suggest the calendar event locations as suggested input for the map application by presenting alphanumerically the calendar event locations in the map application; and
while the calendar application is executing on the computing device, obtaining map locations stored by a map application in a memory of the device to enable a new event interface of the calendar application to suggest the map locations as suggested input for a new event to be created by the calendar application by presenting alphanumerically the map locations in the new event interface of the calendar application.

2. The method as claimed in claim 1 further comprising receiving input into the map application to define one of the map locations.

3. The method as claimed in claim 2 wherein the input received into the map application is a Global Positioning System (GPS) reading of a current location of the device.

4. The method as claimed in claim 3 wherein the GPS reading is only provided as input into the map application if the device remains within a predetermined distance of the current location for more than a predetermined period of time.

5. The method as claimed in claim 2 wherein the input comprises address information that is entered using a user input device.

6. The method as claimed in claim 1 wherein the calendar application is configured to sort and present the map locations in order of proximity from a closest map location relative to a current location of the device to a furthest map location relative to the current location of the device.

7. The method as claimed in claim 1 wherein the map application is configured to only obtain calendar event locations for recent events that fall within a predetermined timeframe.

8. The method as claimed in claim 1 wherein the map application is configured to sort and present the calendar event locations in temporal order from a most recent event to a least recent event.

9. A computer readable memory comprising code which when executed on a processor of a computing device is adapted to perform acts of:
while a map application is executing on the device, pulling calendar event location information from a calendar event data store associated with a calendar application and populating an interface of the map application with location suggestions drawn from the calendar event location information by presenting alphanumerically the calendar event locations in the map application; and
while a calendar application is executing on the device, pulling map location information from a map location data store associated with the map application and populating a new event interface of the calendar application with location suggestions drawn from the map location information by presenting alphanumerically the map locations in the new event interface of the calendar application.

10. The computer readable memory as claimed in claim 9 wherein the code for performing the act of populating the interface of the map application with location suggestions comprises sorting the location suggestions based on time from a most recent event to a least recent event.

11. The computer readable memory as claimed in claim 9 wherein the code for performing the act of populating the interface of the calendar application with location suggestions comprises sorting the location suggestions based on distance from a current location of the device.

12. A computing device comprising:
a memory for storing map location information in a map location data store associated with a map application and for storing calendar event location information in a calendar event data store associated with a calendar application; and
a processor operatively coupled to the memory for executing one or both of the map application and the calendar application;
wherein the map application is configured to pull calendar event location information from the calendar event data store and to present, on an interface of the map application, location suggestions based on the calendar event location information by presenting alphanumerically the calendar event locations in the map application; and
wherein the calendar application is configured to pull map location information from the map location data store and to present, on a new event interface of the calendar application, location suggestions based on the map location information by presenting alphanumerically the map locations in the calendar application.

13. The device as claimed in claim 12 wherein the calendar application is configured to provide an option to identify a specific calendar event location as being a favourite location that is to become one of the suggested locations for the map application.

14. The device as claimed in claim 12 wherein the map application is configured to provide an option to identify a specific map location as being a favourite location that is to become one of the suggested locations for the calendar application.

15. The device as claimed in claim 12 further comprising a Global Positioning System (GPS) receiver for determining a current location of the device and for providing the current location of the device to the map application to enable the map application to decide whether to store the current location in the map location data store if the device remains within a predetermined distance of the current location for longer than a predetermined period of time.

* * * * *